United States Patent
Ruf et al.

(10) Patent No.: US 6,189,677 B1
(45) Date of Patent: Feb. 20, 2001

(54) APPARATUS FOR CONVEYING ARTICLES IN SELECTED DIRECTIONS

(75) Inventors: Lorenz Stefan Ruf, Schaffhausen; Peter Frei, Bülach; Markus Wiesendanger, Zürich, all of (CH)

(73) Assignee: SIG Pack Systems AG, Beringen (CH)

( * ) Notice: Under 35 U.S.C. 154(b), the term of this patent shall be extended for 0 days.

(21) Appl. No.: 09/361,141

(22) Filed: Jul. 27, 1999

Related U.S. Application Data

(63) Continuation-in-part of application No. PCT/CH98/00013, filed on Jan. 15, 1998.

Foreign Application Priority Data

Jan. 28, 1997 (CH) .................................................. 0179/97

(51) Int. Cl.[7] ............................................... B65G 47/24
(52) U.S. Cl. ................... 198/411; 198/414; 198/456; 198/597
(58) Field of Search ..................... 198/394, 414, 198/400, 411, 409, 597, 598, 446, 456, 457.01, 457.07; 193/35 MD

(56) References Cited

U.S. PATENT DOCUMENTS 3,174,613  3/1965  Insolio .
3,613,860 * 10/1971 Waite ................................... 198/446
4,546,870 * 10/1985 Cogo ..................................... 198/400
5,145,049 *  9/1992 McClurkin ....................... 198/395 X

FOREIGN PATENT DOCUMENTS 0 563 824  10/1993  (EP) .
2 259 900   3/1993  (GB) .

* cited by examiner

*Primary Examiner*—James R. Bidwell
(74) *Attorney, Agent, or Firm*—Venable; Gabor J. Kelemen

(57) ABSTRACT

An apparatus for advancing articles in a selected, approximately horizontal conveying direction, includes a plurality of side-by-side disposed table elements each having an upper, approximately horizontal article-supporting surface. The article-supporting surfaces together form an approximately horizontal conveying table. A first drive oscillates each table element parallel to its article-supporting surface in a motion having two motion components oriented in perpendicular, horizontal directions and a second drive vertically oscillates each table element. A first synchronizing arrangement synchronizes the horizontal oscillations in the direction of the two motion components and a second synchronizing arrangement synchronizes the vertical oscillations with the horizontal oscillations. A first adjusting arrangement adjusts the phase of the vertical oscillations with respect to the horizontal oscillations and a second adjusting arrangement individually adjusts an amplitude of the vertical oscillation of each table element.

18 Claims, 4 Drawing Sheets

APPARATUS FOR CONVEYING ARTICLES IN SELECTED DIRECTIONS

CROSS REFERENCE TO RELATED APPLICATIONS

This application is a continuation-in-part of International Application PCT/CH98/00013 filed Jan. 15, 1998.

Further, this application claims the priority of Swiss Application No. 0179/97 filed Jan. 28, 1997, which is incorporated herein by reference.

BACKGROUND OF THE INVENTION

U.S. Pat. No. 3,174,613 describes a conveyor apparatus which includes a plurality of rolls, arranged in rows, between two spaced conveyor belts progressing in identical conveying directions. The axes of the rolls in each row are horizontal and are oriented parallel to one another. The rolls are driven either with the circulating speed of the conveyor belts or with a speed which is 1.4 times higher. The upper, common tangential plane of the rolls is coplanar with the upper face of the conveyor belts. The axes of the rolls of each row may be pivoted jointly about 45° from a basic position in which they are disposed perpendicularly to the advancing direction of the conveyor belts. In the outwardly pivoted position the rolls deliver articles, such as glass panes, to a transverse conveyor belt.

British Published Patent Application No. 2,259,900 describes a conveying apparatus with which articles may be conveyed in one of four selectable directions on an approximately horizontal table. The table is composed of a plurality of side-by-side arranged table elements which execute synchronously translatory oscillations in both directions parallel to the plane of the table. In addition, each table element is driven to oscillate vertically, and the vertical oscillations are synchronized with the horizontal oscillations.

SUMMARY OF THE INVENTION

It is an object of the invention to provide an improved apparatus of the above-outlined type which makes possible a simple adaptation to the conveying speed of the articles with a simple construction.

This object and others to become apparent as the specification progresses, are accomplished by the invention, according to which, briefly stated, the apparatus for advancing articles in a selected, approximately horizontal conveying direction, includes a plurality of side-by-side disposed table elements each having an upper, approximately horizontal article-supporting surface. The article-supporting surfaces together form an approximately horizontal conveying table. A first drive oscillates each table element parallel to its article-supporting surface in a motion having two motion components oriented in perpendicular, horizontal directions, and a second drive vertically oscillates each table element. A first synchronizing arrangement synchronizes the horizontal oscillations in the direction of the two motion components and a second synchronizing arrangement synchronizes the vertical oscillations with the horizontal oscillations. A first adjusting arrangement adjusts the phase of the vertical oscillations with respect to the horizontal oscillations and a second adjusting arrangement individually adjusts an amplitude of the vertical oscillation of each table element.

By providing that the phase of the vertical oscillation of each table element may be adjusted relative to the horizontal oscillations, the articles situated on each table element may be conveyed into an arbitrarily selected direction. By virtue of the individual adjustability of the amplitudes of the vertical oscillation, the conveying speed within the table may also be changed in a simple manner. By oscillating all the table elements in a horizontal plane by a common drive according to a further preferred embodiment, the transporting speed of all the table elements may be simultaneously altered in a simple manner over the entire table by changing the horizontal oscillating frequency or amplitude while maintaining the vertical oscillation amplitude the same.

DESCRIPTION OF THE PREFERRED EMBODIMENTS

Figure 1:
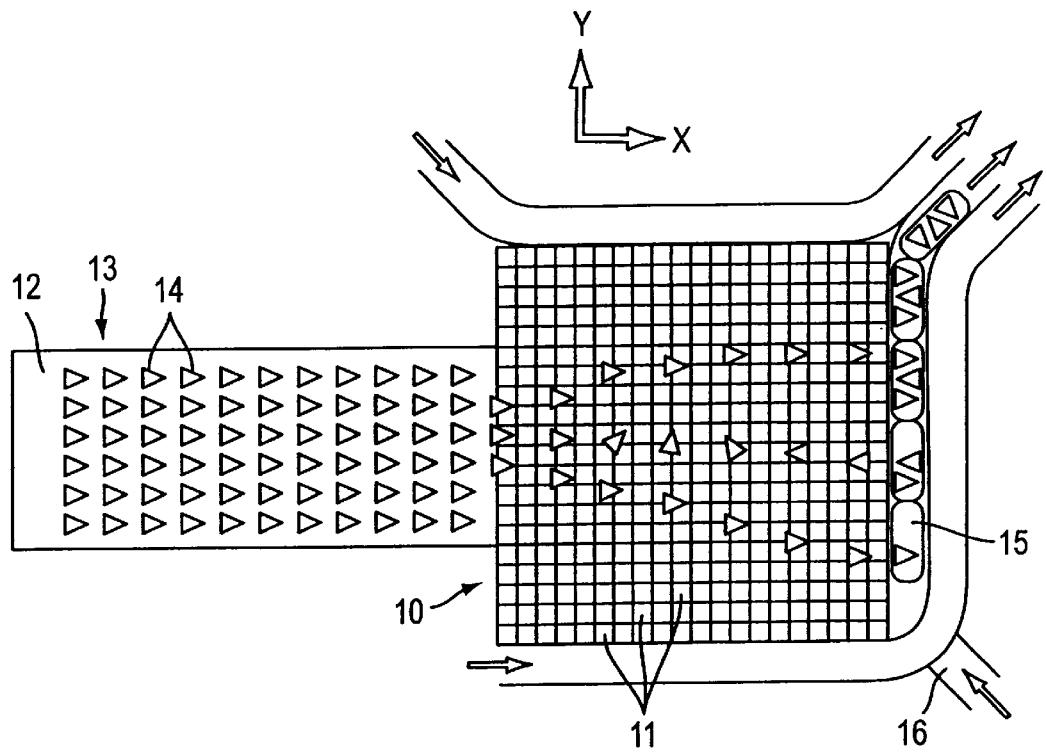
FIG. 1 is a schematic top plan view of a conveyor apparatus incorporating the invention.
Figure 2:
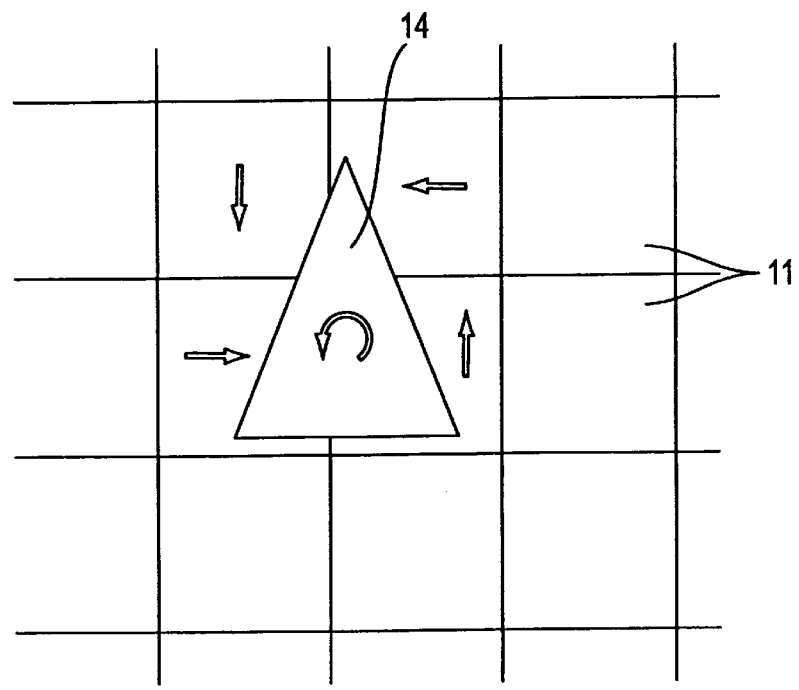
FIG. 2 is an enlarged schematic top plan view of one part of the construction shown in FIG. 1.

FIG. 1 illustrates the apparatus symbolically in a top plan view as used in a packing machine. The apparatus includes a horizontal, square table 10 which is composed of a plurality of square table elements 11 situated in a close vicinity to one another. Each table element 11 has a top, article-supporting surface 11'. A conveyor belt 12 delivers rows 13 of products 14 to the table 10. The products 14 are advanced in the direction x on the table 10 and are distributed in the direction y and, if required, turned to be loaded into packing containers 15 along the right-hand side table edge. The containers 15 are supplied by a separate conveyor 16 and are, subsequently to their being charged with products 14, moved away for further wrapping. Each table element 11 can advance the article which it supports in any desired direction. In case a product 14 is supported by at least two table elements 11, then, upon a suitable selection of the conveying direction, the product may be turned as illustrated in FIG. 2. The outline of the table elements 11 may be, in the alternative, of other than the illustrated square shape: they may be rectangular, triangular or hexagonal. Other polygonal shapes may also be feasible; in such a case, however, the table elements 11 would not be uniform.

Figure 3:
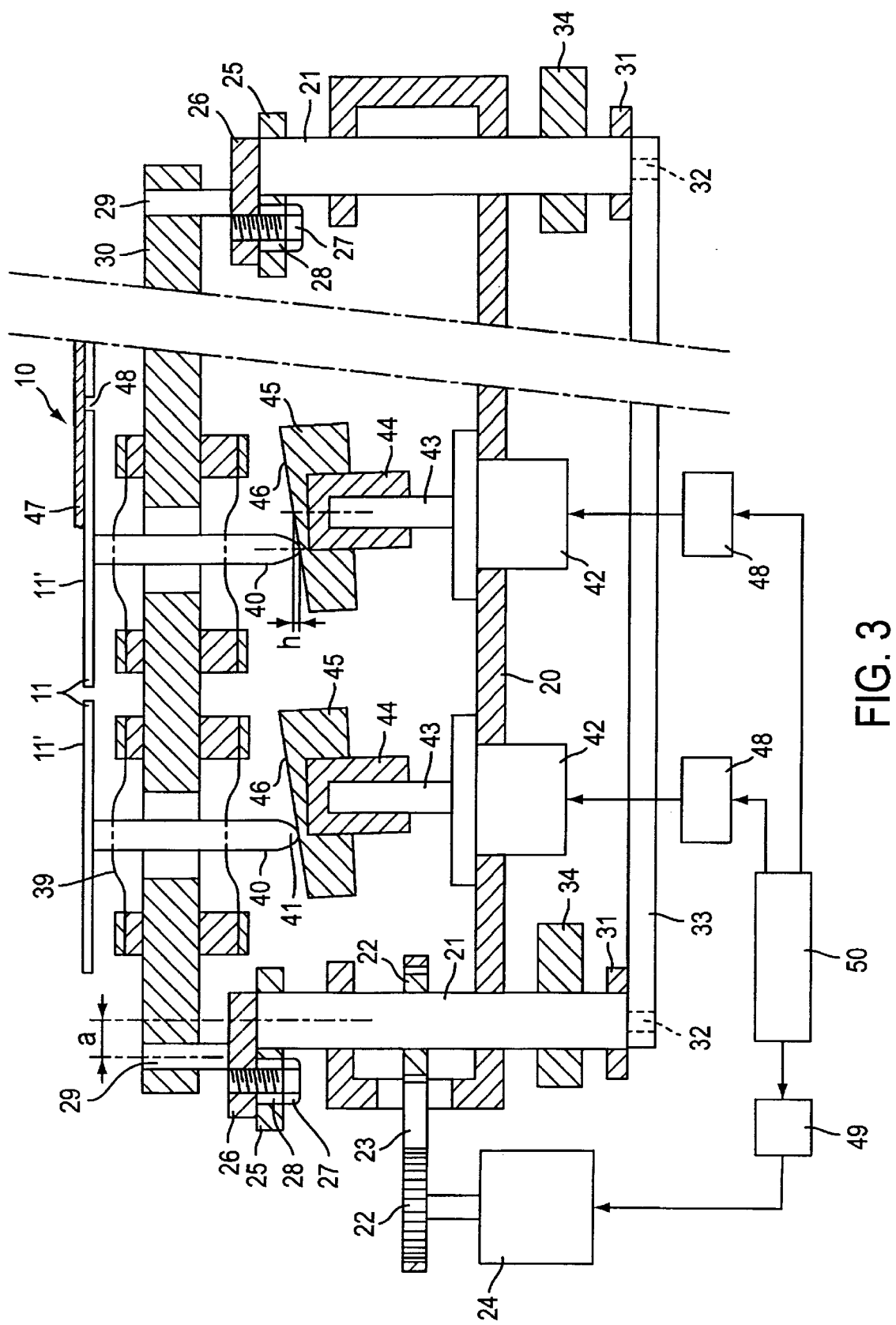
FIG. 3 is a schematic fragmentary sectional elevation of a preferred embodiment of the invention.

FIG. 3 shows a section of a part of a preferred embodiment. On a stand 20 two vertically oriented drive shafts 21 are rotatably and axially non-displaceably supported. One shaft 21 is driven by belt sprockets 22 and a toothed belt 23 from an rpm-regulated drive motor 24 which is controlled by a control device 49. Respective guide members 25 are affixed to the upper end of each drive shaft 21. On each guide member 25 a sled 26 is guided for displacement transversely to the axis of the shafts 21 and may be immobilized by means of screws 27 which project through slots 28 of the guide members 25. The sleds 26 carry a respective eccentric pin 29 extending parallel to the shafts 21. By releasing the sleds 26 by the screws 27 and by displacing them relative to the respective guide member 25, the eccentricity a of the pins 29 may be adjusted. The pins 29 are supported in a joint, horizontal carrier plate 30 for rotation. To the lower end of each shaft 21 a respective flange 31 is secured which carries a further, non-adjustable eccentric pin 32. The eccentricity of the pins 32 is offset by 90° relative to the eccentricity of the pins 29. The pins 32 are rotatably supported in a coupling bar 33. Both shafts 21 are connected to one another to rotate as a unit: When the motor 24 is running, the carrier plate 30 executes a circular motion in its plane, imparted by the left-hand pin 29, and the circular motion is, in turn, imparted by the right-hand pin 29 to the right-hand shaft 21. Further, to the shafts 21 a respective eccentric mass 34 is secured for compensating for the imbalance of the carrier plate 30.

Each table element 11 is supported on the plate 30 by leaf springs 39 such that each table element 11 is vertically displaceable parallel to itself. A plunger 40 extends centrally from each table element 11 in a downward direction through respective openings provided in the carrier plate 30 and is provided with a tapered end 41.

A respective servomotor or stepping motor 42 is secured to the machine frame 20 such that it is laterally offset from the axis of each respective plunger 40 at a distance which corresponds to the eccentricity a of the pins 29. The motor 42 has a vertical output shaft 43 to which a cylindrical pin 44 is secured, having an axis which is inclined to the axis of the shaft 43. A cylindrical shoe 45 is coaxially secured to the pin 44. The shoe 45 has an oblique, planar top face 46 engaged by the terminus 41 of the plunger 40. The angle which is formed by the surface 46 with a radial plane of the shoe 45 corresponds to the angle at which the axes of the shaft 43 and the pin 44 intersect. By rotating the shoe 45 relative to the pin 44 the inclination of the surface 46 relative to the horizontal may be set from 0° to the illustrated maximum inclination. Each motor 42 is individually controllable by a control device 48 so that the surfaces 46 may be individually set into a desired orientation. The controls 48, 49 are controlled by a joint control device 50. The upper face of the table 10 may be covered by a thin, flexible sheet 47 made, for example, of polyurethane or another synthetic material which bridges over the clearances 48 between the table elements 11. In this manner the risk of soiling is reduced.

In the description which follows, the operation of the above-described apparatus will be set forth.

The motor 24 rotates with a set, constant rpm, for example, 10–30 Hz, so that the table elements 11 execute, in their own plane, a circular motion having, for example, a radius of 5 mm. Because of the inclination of the surfaces 46, the table elements 11 also perform a periodic vertical motion having a stroke amplitude h of, for example, 1.8 mm. The frequency, the radius a and the stroke h are selected such that the downward acceleration of the table elements 11 at least in the region of the upper dead center of the stroke is greater than the gravitational acceleration so that the product 14 lifts off periodically from the respective table element 11. Since the table element 11, because of its circular motion, has moved away from under the floating product 14, by the time the latter again lies on the table element 11, it has been shifted relative thereto and thus has executed a translational motion on the table 10. By rotating the shoe 45 about the axis of the shaft 43 the direction of motion may be selectively chosen: it may differ in different sectors of the table 10. It is, for example, feasible to move the products 14 on the table 10 along a circular path. If one of the motors 42 rotates synchronously with the shafts 21, the product 14 remains stationary on the respective table element 11 because in such a case no vertical oscillation occurs. The speed of the motion depends from the rpm of the motor 24, the eccentricity a and the stroke amplitude h. When the rpm and/or the eccentricity a and/or the stroke amplitude h is increased, the speed increases. The stroke amplitude h, however, may be selected to be so small that the products 14 are not lifted off the upper surface of the table elements 11. In such a case the frequency and the eccentricity a are so set that the products 14 slide on the upper face of the table elements 11 at least in phases, that is, during the downward acceleration of the elements 11. During an upward acceleration, the frictional force between the table elements 11, on the one hand, and the products 14, on the other hand, is greater than for the downward acceleration so that in such a case a translational motion of the products 14 on the table 10 takes place.

Figure 4A:
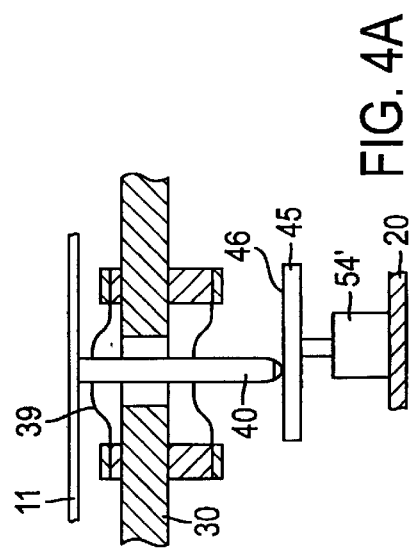
FIG. 4a is a fragmentary sectional elevation of another variant of FIG. 3.
Figure 4:
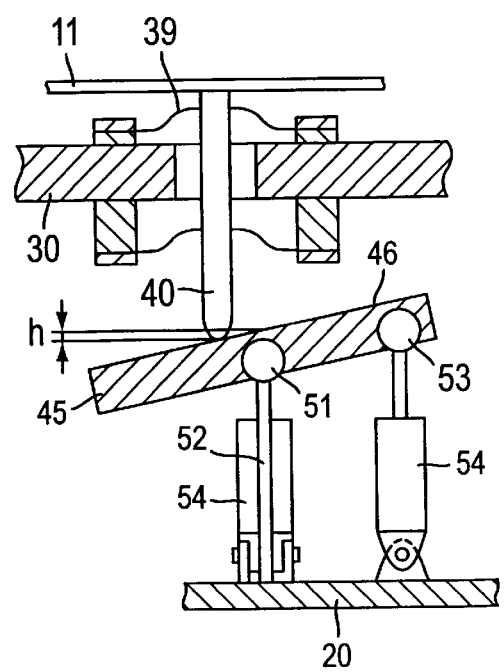
FIG. 4 is a fragmentary sectional elevation of a variant of FIG. 3.

FIG. 4 shows a variant for the actuation of the shoe 45. In the embodiment shown in FIG. 4, the shoe 45 is a circular disk which is supported in its middle on a ball joint 51 which, in turn, is mounted on a column 52 secured to the machine frame 20. On the periphery of the shoe 45, at 90° apart, there are provided two further universal joints 53 (only one is visible), each of which is height-adjustable by a separate, linear stroke producing element 54. The elements 54 which are pivotally secured to the machine frame 20, may be, for example, stepping motors with threaded spindles or may be linear motors provided with resetting means. This variant has the advantage that not only the direction but also the extent of inclination of the surface 46, that is, the stroke amplitude h may be individually adjusted for each table element 11. In this manner, for the products 14 on the table 10 different speeds in different sectors may be predetermined.

Turning to FIG. 4a, departing from the structure of FIG. 4, as the carries plate 30 circulates in a horizontal plane, the shoe 45 is oscillated vertically. For this purpose, a sole, linear stroke producing component 54' is provided which is secured to the machine frame 20 and which is driven to execute vertical strokes synchronously with the horizontal oscillation of the carries plate 30. The stroke amplitude and the phase of motion with respect to the horizontal oscillation may be adjusted for the stroke producing component 54'.

Figure 5:
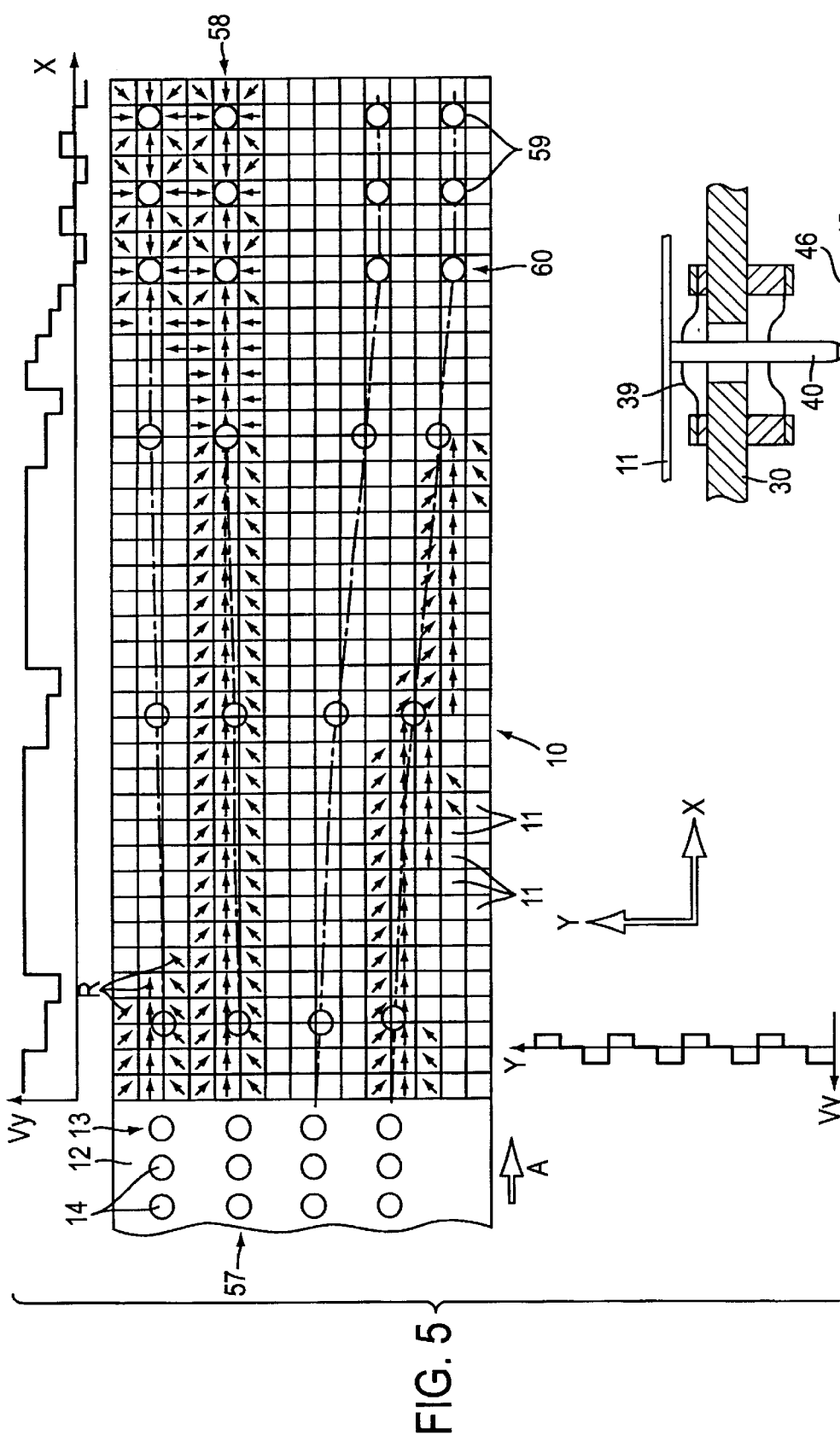
FIG. 5 is a symbolic top plan view, with diagrams, of the conveyor apparatus of the invention, illustrating the mode of operation.

FIG. 5 illustrates a mode of use of the above-described embodiments for dividing and grouping the products 14 delivered to the apparatus by the belt 12.

The average advancing speed $v_x$, on the table 10 in the conveying direction A of the belt 12 is greater than the belt speed. The products 14 are delivered in four columns 57 which are shifted laterally on the table 10 by an appropriate selection of the conveying direction of the table elements 11 to form table columns 58. In each instance, to the right and the left of each such table column 58, the conveying direction R of the table elements 11 has a component which is oriented towards such column 58. At the right-hand edge of the table 10 the products 14 are grouped into two groups, each containing six fields 59, formed by a respective table element 11. The conveying direction of the table elements 11 which immediately surround the fields 59 is oriented radially toward these fields. The transporting velocity of the fields 59 is zero. As soon as a group 60 is complete, it is moved away for packaging, for example, by means of suction grippers. Between the left edge of the table 10 and the groups 60 to be formed, the rows 13 are moved in the x direction with propagating waves. At the respective desired position of the row 13 the table elements 11 convey the articles with the desired velocity in the x direction. The table elements 11 situated immediately to the right, convey the articles slower whereas each table element 11 to the left conveys the articles faster. In this manner it is feasible to hold the rows 13 on the table 10 in an aligned manner and to align them in case they are delivered unaligned by the conveyor belt 12. The apparatus is preferably controlled by means of a non-illustrated optical recognition device disposed above the table 10.

Figure 6:
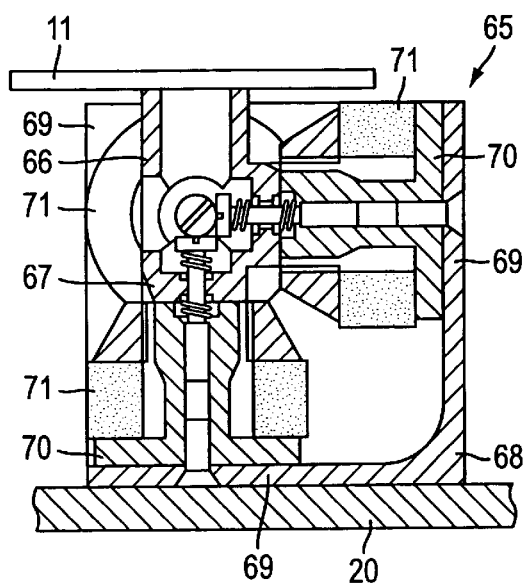
FIG. 6 is a sectional elevational view of a further preferred embodiment of the invention.
Figure 7:
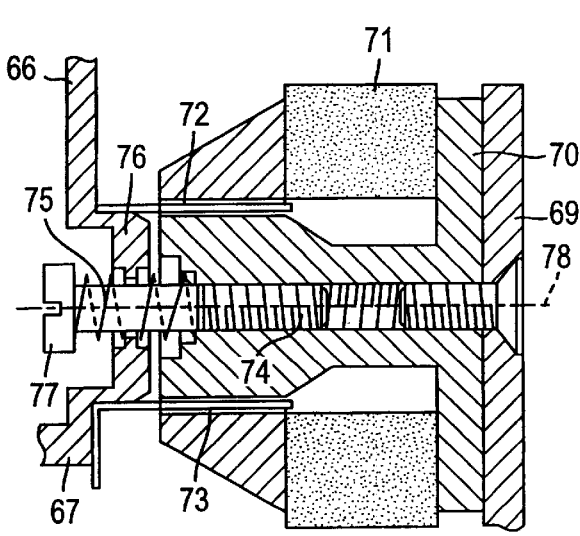
FIG. 7 is an enlarged sectional view of a part of the structure shown in FIG. 6.
Figure 8:
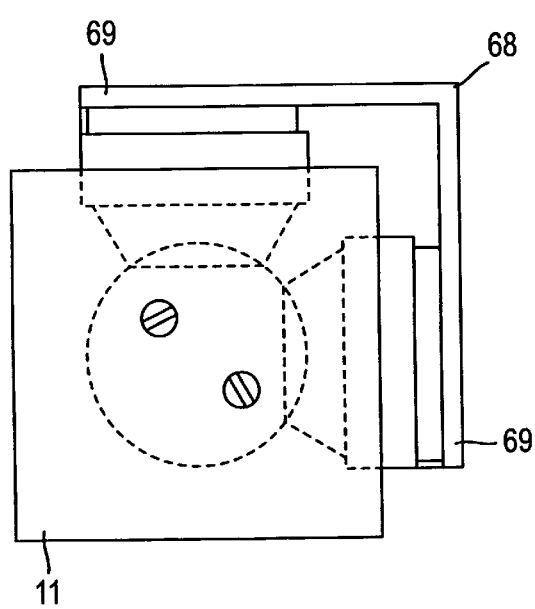
FIG. 8 is a top plan view of the construction shown in FIG. 6.

FIGS. 6, 7 and 8 illustrate a further embodiment of the invention. A separate drive 65 is mounted on the machine frame 20 for each table element 11. A cross-sectionally square tube 66 having a planar bottom 67 is affixed centrally to, and extending downwardly from, each the table element 11. The tube 66 is surrounded by a box-like carrier 68 having three mutually perpendicular walls 69 and being mounted on the machine frame 20. A ferromagnetic armature 70 carrying a respective coil 71 is secured to each wall 69. A respective plunger coil 72 affixed to the tube 66 or, as the case may be, to the bottom 67 thereof, extends into a cylindrical air gap 73 of the armature 70. A screw 74 which is threaded coaxially into the armature 70 carries two biased compression springs 75 which are supported, on the one hand, on an extension 76 of the tube 66 at the bottom 67 and, on the other hand, by the underside of the screw head 77. In this manner, each table element 11 is positioned in its central orientation.

An alternating current with a selected, identical frequency is applied to the three plunger coils 72. The phase and the amplitude of the AC voltage is settable individually among the three coils 72. If, for example, for both coils 72 having a horizontal axis 78 the amplitude is the same and the phase shift is 90°, the table element 11 executes a circular motion parallel to itself. The advancing direction and velocity of the products 14 may be set by adjusting the phase shift and the amplitude of the coil 72 having a vertical axis. In this embodiment, instead of a circular motion, an elliptical or a linear horizontal motion of the table element 11 may be achieved dependent on the phase shift and the amplitude relationship between the voltages applied to the coils 72 having a horizontal axis. Thus, in the embodiment according to FIGS. 6, 7 and 8 each table element 11 is horizontally and vertically oscillated by its own electromagnetic assembly composed of three electromagnets.

The three plunger coil assemblies 70–75 may be replaced by three linear motors with resetting means. Such an arrangement has the advantage that the oscillation amplitudes are independent from weight or whether a product 14 is present or not. This is particularly advantageous during the transfer of a product 14 from one table element 11 to another.

It will be understood that the above description of the present invention is susceptible to various modifications, changes and adaptations, and the same are intended to be comprehended within the meaning and range of equivalents of the appended claims.

What is claimed is:

1. An apparatus for advancing an article in a selected, approximately horizontal conveying direction, comprising
   (a) a plurality of side-by-side disposed table elements each having an upper, approximately horizontal article-supporting surface; the article-supporting surfaces together forming an approximately horizontal conveying table;
   (b) first drive means for oscillating each said table element parallel to said article-supporting surface in a motion having two motion components oriented in perpendicular, horizontal directions;
   (c) second drive means for vertically oscillating each said table element;
   (d) first synchronizing means for synchronizing the horizontal oscillations in the direction of the two motion components;
   (e) second synchronizing means for synchronizing the vertical oscillations with the horizontal oscillations;
   (f) first adjusting means for adjusting a phase of said vertical oscillations of each said table element with respect to said horizontal oscillations; and
   (g) second adjusting means for individually adjusting an amplitude of the vertical oscillation of each table element.

2. The apparatus as defined in claim 1, further comprising a separate drive coupled to each said table element; each said drive including said first and second drive means.

3. The apparatus as defined in claim 2, wherein said drive includes first and second electromagnets each having respective first and second armatures connected to said table element and being movable, respectively, in two mutually perpendicular horizontal directions; said first and second electromagnets forming said first drive means; said drive further including a third electromagnet having a third armature connected to said table element and being movable in a vertical direction; respectively, in two mutually perpendicular horizontal directions said third electromagnet forming said second drive means.

4. The apparatus as defined in claim 1, further comprising a third adjusting means for adjusting motion amplitudes in a direction of said two motion components.

5. The apparatus as defined in claim 1, further comprising means for setting the oscillations in a direction of the two horizontal motion components at a phase shift of 90°.

6. The apparatus as defined in claim 1, further comprising a third adjusting means for adjusting a frequency of the oscillations.

7. The apparatus as defined in claim 1, wherein said article-supporting surface of said table elements is one of a rectangle, a triangle and a hexagon.

8. The apparatus as defined in claim 1, further comprising a flexible, continuous cover sheet extending over said table elements for bridging gaps therebetween.

9. An apparatus for advancing an article in a selected, approximately horizontal conveying direction, comprising
   (a) a plurality of side-by-side disposed table elements each having an upper, approximately horizontal article-supporting surface; the article-supporting surfaces together forming an approximately horizontal conveying table;
   (b) first drive means for oscillating each said table element parallel to said article-supporting surface in a motion having two motion components oriented in perpendicular, horizontal directions; said first drive means including
      (1) a frame;
      (2) means for supporting said table elements on said frame for vertical displacements relative to said frame; and
      (3) a drive for oscillating said frame, together with said table elements, in a direction of said two motion components;
   (c) second drive means for vertically oscillating each said table element;
   (d) first synchronizing means for synchronizing the horizontal oscillations in the direction of the two motion components;

(e) second synchronizing means for synchronizing the vertical oscillations with the horizontal oscillations; and (f) adjusting means for adjusting a phase of said vertical oscillations of each said table element with respect to said horizontal oscillations.

10. The apparatus as defined in claim 9, wherein said drive of said first drive means comprises first and second parallel-spaced drive shafts and means for eccentrically supporting said frame on said drive shafts.

11. The apparatus as defined in claim 9, wherein said second drive means comprises a plunger affixed to an underside of each said table element and extending vertically downwardly therefrom; said plunger having a free end remote from said table element; a carrier member secured to said frame and having a top surface engaged by said free end of said plunger; said top surface being inclined relative to said article-supporting surface of said table element and having a slope direction; further wherein said adjusting means includes means for adjusting said slope direction.

12. The apparatus as defined in claim 9, further comprising an additional adjusting means for individually adjusting an amplitude of the vertical oscillation of each table element.

13. The apparatus as defined in claim 9, further comprising an additional adjusting means for adjusting motion amplitudes in a direction of said two motion components.

14. The apparatus as defined in claim 9, further comprising means for setting the oscillations in a direction of the two horizontal motion components at a phase shift of 90°.

15. The apparatus as defined in claim 9, further comprising an additional adjusting means for adjusting a frequency of the oscillations.

16. The apparatus as defined in claim 9, wherein said article-supporting surface of said table elements is one of a rectangle, a triangle and a hexagon.

17. The apparatus as defined in claim 9, further comprising a flexible, continuous cover sheet extending over said table elements for bridging gaps therebetween.

18. The apparatus as defined in claim 9, wherein said second drive means comprises a plunger affixed to an underside of each said table element and extending vertically downwardly therefrom; said plunger having a free end remote from said table element; a carrier member having a top surface engaged by said free end of said plunger; said top surface being parallel to said article-supporting surface of said table element; and a linear stroke producing component connected to said carrier member for vertically oscillating said carrier member.

* * * * *